US012009599B2

(12) United States Patent
Khripkov et al.

(10) Patent No.: US 12,009,599 B2
(45) Date of Patent: Jun. 11, 2024

(54) DUAL-POLARIZATION ANTENNA ARRAY

(71) Applicant: HUAWEI TECHNOLOGIES CO., LTD., Guangdong (CN)

(72) Inventors: Alexander Khripkov, Helsinki (FI); Ville Viikari, Aalto (FI); Resti Montoya Moreno, Aalto (FI); Juha Ala-Laurinaho, Aalto (FI); Janne Ilvonen, Helsinki (FI)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 366 days.

(21) Appl. No.: 17/310,359

(22) PCT Filed: Jan. 30, 2019

(86) PCT No.: PCT/EP2019/052196
§ 371 (c)(1),
(2) Date: Jul. 29, 2021

(87) PCT Pub. No.: WO2020/156650
PCT Pub. Date: Aug. 6, 2020

(65) Prior Publication Data
US 2022/0102874 A1 Mar. 31, 2022

(51) Int. Cl.
*H01Q 21/08* (2006.01)
*H01Q 9/04* (2006.01)
*H01Q 13/10* (2006.01)

(52) U.S. Cl.
CPC .......... *H01Q 21/08* (2013.01); *H01Q 9/0435* (2013.01); *H01Q 13/106* (2013.01)

(58) Field of Classification Search
None
See application file for complete search history.

(56) References Cited

U.S. PATENT DOCUMENTS 9,871,299 B2 1/2018 Ganchrow et al.
9,905,922 B2 2/2018 Lee et al.
(Continued)

FOREIGN PATENT DOCUMENTS

JP H05199031 A 8/1993
KR 20060020478 A 3/2006
(Continued)

OTHER PUBLICATIONS

Manoj Stanley et al, A High Gain Steerable Millimeter-Wave Antenna Array for 5G Smartphone Applications, Proc. 11th Eur. Conf. Antennas Propag. (EuCAP), 2017, 4 pages.
(Continued)

*Primary Examiner* — Anh Q Tran
(74) *Attorney, Agent, or Firm* — WOMBLE BOND DICKINSON (US) LLP

(57) ABSTRACT

Embodiments of the present invention provide a dual-polarization antenna array that includes: a conductive structure having an aperture pattern including at least one first aperture and at least one second aperture, the first aperture(s) being directly interconnected with at least one second aperture. At least one first coupling element is connected to a first antenna feed line to excite a first electrical field having a first polarization. At least one second coupling element is connected to a second antenna feed line to excite a second electrical field having a second polarization. Each first coupling element is at least partially juxtaposed with one first aperture, allowing said first electrical field to be transmitted and/or received through said first aperture. Each second coupling element being at least partially juxtaposed with one second aperture, allowing said second electrical field to be transmitted and/or received through said second aperture.

19 Claims, 8 Drawing Sheets

(56) References Cited

U.S. PATENT DOCUMENTS

| | | | | |
|---|---|---|---|---|
| 10,135,122 | B2 * | 11/2018 | Apostolos | H01Q 1/243 |
| 2010/0149068 | A1 | 6/2010 | Petersson et al. | |
| 2012/0242553 | A1 | 9/2012 | Leung et al. | |
| 2013/0088397 | A1 | 4/2013 | Mo et al. | |
| 2016/0118713 | A1 | 4/2016 | Hong et al. | |
| 2017/0033848 | A1 | 2/2017 | Cordeiro et al. | |
| 2017/0069958 | A1 | 3/2017 | Ko et al. | |
| 2017/0201011 | A1 | 7/2017 | Khripkov et al. | |
| 2017/0294705 | A1 | 10/2017 | Khripkov et al. | |
| 2018/0048074 | A1 | 2/2018 | Lilja | |
| 2018/0090816 | A1 | 3/2018 | Mow et al. | |
| 2018/0287253 | A1 | 10/2018 | Apostolos et al. | |

FOREIGN PATENT DOCUMENTS

| | | | | |
|---|---|---|---|---|
| KR | 20120102516 | A | 9/2012 | |
| KR | 20140075015 | A | 6/2014 | |
| WO | 2018156829 | A1 | 8/2018 | |
| WO | WO-2018156829 | A1 * | 8/2018 | H01Q 1/2291 |
| WO | 2018206116 | A1 | 11/2018 | |

OTHER PUBLICATIONS

Naser Ojaroudiparchin et al, Design of Vivaldi Antenna Array with End-Fire Beam Steering Function for 5G Mobile Terminals, 23rd Telecommunications forum TELFOR 2015, Serbia, Belgrade, Nov. 24-26, 2015, 4 pages.

Shuai Zhang et al, A Planar Switchable 3-D-Coverage Phased Array Antenna and Its User Effects for 28-GHz Mobile Terminal Applications, IEEE Transactions On Antennas and Propagation, vol. 65, No. 12, Dec. 2017, 9 pages.

* cited by examiner

DUAL-POLARIZATION ANTENNA ARRAY

This application is a National Stage of International Patent Application No. PCT/EP2019/052196, filed on Jan. 30, 2019, which is hereby incorporated by reference in its entirety.

TECHNICAL FIELD

The disclosure relates to a dual-polarization antenna array comprising a conductive structure having an aperture pattern comprising at least one first aperture having a first configuration and at least one second aperture having a second configuration.

BACKGROUND

Future mobile electronic devices need to support millimeter-wave bands, e.g. 28 GHz and 42 GHz, as well as sub-6 GHz bands in order to accommodate increased data rates. However, the volume reserved for all the antennas in a mobile electronic device is very limited and the added millimeter-wave antennas should ideally be accommodated to the same volume as the sub-6 GHz antennas. Increasing the volume reserved for antennas would make the electronic device larger, bulkier, and less attractive to users. Current millimeter-wave antennas either require such additional volume, or if placed in the same volume, significantly reduce the efficiency of sub-6 GHz antennas.

Furthermore, the movement towards very large displays, covering as much as possible of the electronic device, makes the space available for the antenna array very limited, forcing either the size of the antenna array to be significantly reduced, and its performance impaired, or a large part of the display to be inactive.

Additionally, mobile electronic devices, such as mobile phones and tablets, may be oriented in any arbitrary direction. Therefore, such electronic devices need to exhibit an as near full spherical beam coverage as possible. Such coverage is difficult to achieve, i.e. due to the radiation beam being blocked by a conductive housing, a large display, and/or by the hand of the user holding the device.

SUMMARY

It is an object to provide an improved dual-polarization antenna array. The foregoing and other objects are achieved by the features of the independent claim. Further implementation forms are apparent from the dependent claims, the description, and the figures.

According to a first aspect, there is provided a dual-polarization antenna array comprising a conductive structure having an aperture pattern comprising at least one first aperture having a first configuration and at least one second aperture having a second configuration, the first aperture being directly interconnected with at least one second aperture, at least one first coupling element being connected to a first antenna feed line, at least one second coupling element being connected to a second antenna feed line, the first coupling element being configured to excite an electrical field having a first polarization, the second coupling element being configured to excite an electrical field having a second polarization, each first coupling element being at least partially juxtaposed with one first aperture, allowing the electrical field having a first polarization to be transmitted and/or received through the first aperture, each second coupling element being at least partially juxtaposed with one second aperture, allowing the electrical field having a second polarization to be transmitted and/or received through the second aperture.

Such a solution, comprising a periodic sequence of differently shaped apertures, facilitates a dual-polarized antenna array arranged within the same space of a conductive structure, which, in turn, reduces the volume needed for providing an efficient antenna array having omnicoverage, or near omnicoverage. Since both polarizations use parts of the same conductive structure, the total length of the dual-polarization antenna array can be reduced. Furthermore, such a solution is relatively easy to manufacture as well as aesthetically appealing, since it can be designed to resemble current microphone and speaker grill slots. The volumes of each first aperture and each second aperture are effectively increased by their corresponding direct interconnection, thus effectively increasing the efficiency and bandwidth of antenna elements having the first polarization and antenna elements having the second polarization.

In an embodiment of the dual-polarization antenna array, the first coupling element and the second coupling element are configured to perform polarization MIMO and/or diversity wireless communication.

In an embodiment, the first aperture has a larger area than the second aperture, the first coupling element being configured to excite an electrical field having horizontal polarization, the second coupling element being configured to excite an electrical field having vertical polarization, which allows electrical fields of dual polarization to radiate through an as small total aperture window as possible, making the conductive structure mechanically robust. At that, isolation between the first coupling element and the second coupling element is improved by the orthogonally configured electrical fields of horizontal and vertical polarization. Thus, the efficiency of the dual-polarized antenna array is further improved. An embodiment further enables beamforming and beamshaping of the horizontal polarization electromagnetic radiation independently and uncorrelated from beamforming of the vertical polarization radiation.

In an embodiment, a first end of the second coupling element is connected to the second antenna feed line at one side of the second aperture, a second end of the second coupling element being coupled to the conductive structure at an opposite side of the second aperture, allowing vertical polarization to be excited by creating a voltage across the second aperture. Thus, the second coupling element enables wide-band high efficiency antenna operation by suppressing parasitic electromagnetic modes and by providing impedance control.

In an embodiment, the second end of the second coupling element is at least one of galvanically, inductively, and capacitively coupled to the conductive structure, allowing a choice between more secure coupling and more simplified manufacture of the conductive structure.

In an embodiment, a first end of the first coupling element is connected to the first antenna feed line at one side of the second aperture, and a second end of the first coupling element is at least partially juxtaposed with the first aperture, the first aperture being adjacent the second aperture, further facilitating a robust conductive structure having as little aperture area as possible. This structure enables wide-band high efficiency antenna operation by suppressing parasitic electromagnetic modes and providing impedance control.

In an embodiment, the second end of the first coupling element is offset from the first end of the first coupling element in a direction towards an adjacent, further second aperture, allowing horizontal polarization to be excited by a first probe juxtaposed with a wider aperture. This topology supports dual-resonant or multi-resonant frequency response, further improving bandwidth and efficiency of the antenna operation.

In an embodiment, the first coupling element and the second coupling element are connected to one of a balanced antenna feed line and an unbalanced antenna feed line, allowing the coupling element to be disconnected from or connected to a conductive structure. The coupling element being disconnected from the conductive structure enables a low-cost, mechanically stable assembly process, while the coupling element being connected to the conductive structure enables a reduction of the antenna thickness and efficiency improvement.

In an embodiment, the dual-polarization antenna array comprises at least two first apertures and at least one second aperture, the first apertures and the second aperture being arranged in periodic sequence such that each first aperture is separated from an adjacent first aperture by a second aperture, and each second aperture is directly interconnected with two adjacent first apertures, allowing the two polarizations to be formed across the same section of conductive structure. This configuration enables dual-polarization beamforming. Each dual-polarization antenna element is isolated from adjacent dual-polarization antenna elements by the conductive structure, thus further improving efficiency and beam-forming performance.

In an embodiment, the first coupling elements and the second coupling elements are arranged such that every other second aperture is at least partially juxtaposed with a second coupling element and every other second aperture is at least partially juxtaposed with a first coupling element, and each first coupling element additionally being at least partially juxtaposed with one first aperture adjacent the second aperture, the first coupling element and the second coupling element being arranged offset from each other which allows use of unbalanced feeds. By interleaving the first coupling elements and the second coupling elements further reduction of the antenna thickness is enabled by utilization of microstrip or coplanar feed lines. Isolation between adjacent coupling elements is further improved by their spatial separation.

In an embodiment, one first coupling element and one second coupling element are at least partially juxtaposed with one second aperture, the overlap of the first coupling element and the second coupling element facilitating a more compact solution. By collocating the first coupling element and the second coupling element, the length of the dual-polarization antenna array is reduced. Isolation between collocated coupling elements is configured by the orthogonal modes of the electromagnetic fields generated by the coupling elements.

In an embodiment, the aperture pattern comprises at least one H-pattern, each H-pattern comprising two first apertures and one second aperture, the second aperture directly interconnecting the first apertures, facilitating a more robust conductive structure due to the possibility of having continuous sections of the conductive structure extending between each H-pattern. The dual-polarization antenna element configured by each H-pattern aperture enables dual-polarization beamforming. Each dual-polarization antenna element is isolated from adjacent dual-polarization antenna elements by the conductive structure, thus further improving efficiency and beam-forming performance.

According to a second aspect, there is provided an electronic device comprising a display, a device chassis, and a dual-polarization antenna array according to the above, the conductive structure of the dual-polarization antenna array comprising a metal frame, the device chassis being at least partially enclosed by the display and the metal frame, first coupling elements and second coupling elements of the dual-polarization antenna array being coupled to the metal frame. Such a solution facilitates a dual-polarized antenna array from which the electromagnetic fields radiate from edges of the electronic device, improving the beamforming and beamsteering coverage of the antenna array. The communication performance of the electronic device is further improved by beamforming directed along edges the electronic device, as those edges remain exposed to free-space in typical user scenarios.

In an embodiment, the conductive structure further comprises a printed circuit board, the printed circuit board extending at least partially in parallel with the metal frame, between the metal frame and the device chassis, the device chassis being at least partially enclosed by the display and the metal frame, the first coupling elements and the second coupling elements of the dual-polarization antenna array being arranged on the printed circuit board. The aperture pattern provided in the metal frame and in the printed circuit board (PCB) not only allows dual polarization, but also facilitates an as small total aperture window as possible which makes metal frame mechanically robust. Since both polarizations use parts of the same conductive structure, the total length of the dual-polarization antenna array can be reduced. Furthermore, coexistence with sub 6-GHz antennas is enabled since the aperture pattern does not degrade low band antenna performance.

In an embodiment, the electronic device further comprises a reflecting structure extending in parallel with the at least one first aperture and the at least one second aperture of the conductive structure, increasing the coupling to the metal frame. Further, the beam shaping of the dual-polarization antenna array is improved by directing the electromagnetic radiation from the edges of the electronic device.

In an embodiment, the dual-polarization antenna array is configured to generate millimeter-wave frequencies, facilitating the introduction of millimeter-wave antennas without affecting the visual appearance, robustness, or manufacturability of the electronic device. Millimeter-wave antennas enable wireless communication in 5G and beyond 5G electronic devices.

In an embodiment, the dual-polarization antenna array comprises at least one end-fire antenna element, facilitating an end-fire array pattern essential to achieve omnicoverage. The communication performance of the electronic device is further improved by beamforming directed along edges the electronic device, as those edges remain exposed to free-space in typical user scenarios.

In an embodiment, the electronic device comprises at least one further antenna array, the further antenna array being configured by the device chassis and the metal frame with feed lines extending partially adjacent the dual-polarization antenna array and partially across a gap between the device chassis and the metal frame, the further antenna array generating non-millimeter-wave frequencies, allowing two types of antennas to be arranged in the same space without the performance of either antenna being significantly degraded. Coexistence of a millimeter-wave dual-polarization antenna array and a further antenna array within the same volume of the gap between the device chassis and the metal frame further reduces the total antenna volume necessary within the electronic device and enables a further increase of the display surface. Coexistence of the dual-polarization antenna array with the further antenna array is enabled since the aperture pattern of the metal frame does not degrade the further antenna array performance.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 8A:
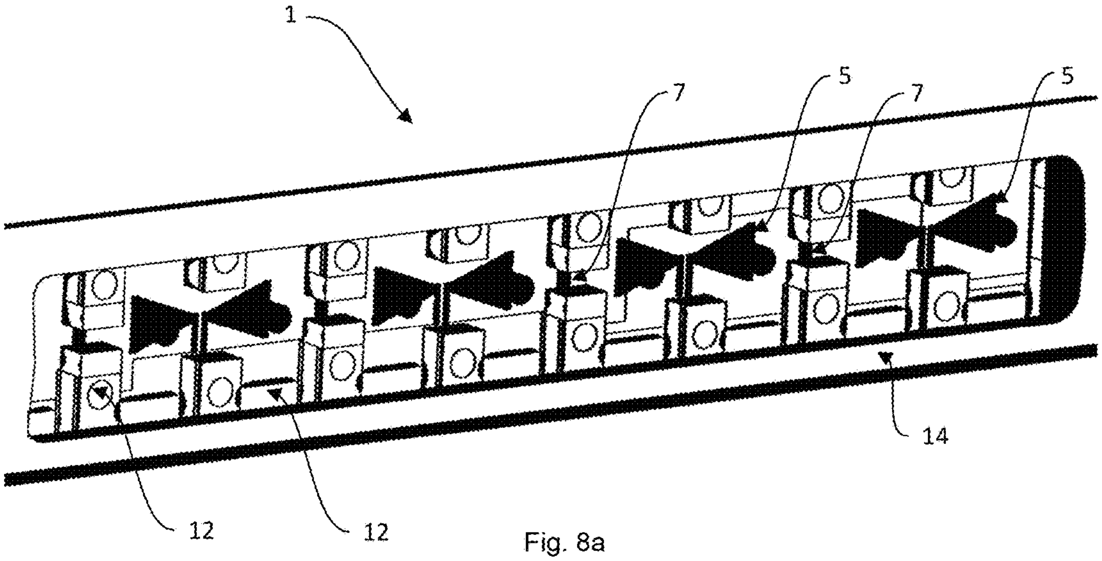
FIG. 8*a* shows a partial perspective view an electronic device with a conductive structure according to an embodiment of the application.
Figure 8B:
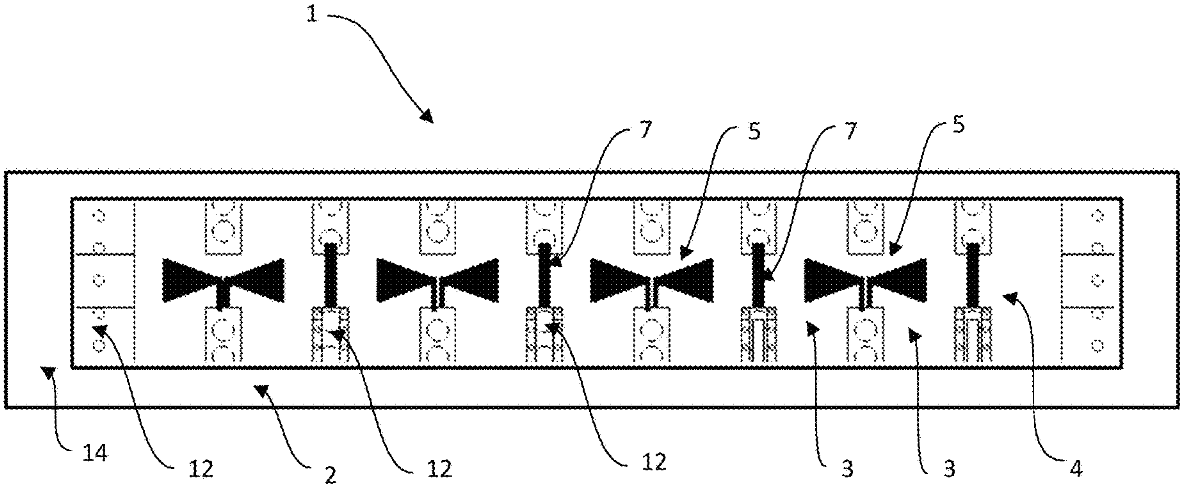
FIG. 8*b* shows a front view of the embodiment of FIG. 8*a* according to an embodiment of the application.

FIG. 8*a* and 8*b* show an embodiment of an electronic device 9, such as a mobile phone or a tablet, comprising a display 10, a device chassis 11, and a dual-polarization antenna array 1 which includes a conductive structure 2, comprising a metal frame 14 and a PCB 12, having an aperture pattern.

Figure 1A:
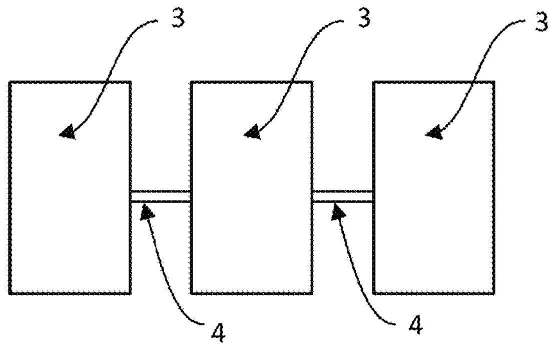
FIG. 1*a* to 1*c* show schematic illustrations of aperture patterns used in a dual-polarization antenna array according to an embodiment of the application.
Figure 1B:
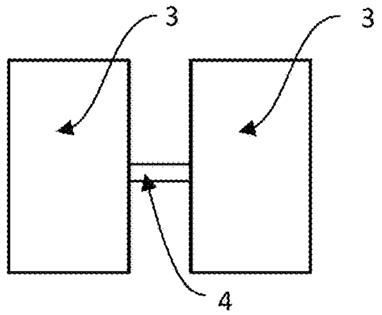
Figure 1C:
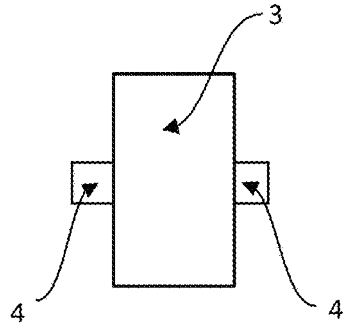
Figure 2A:
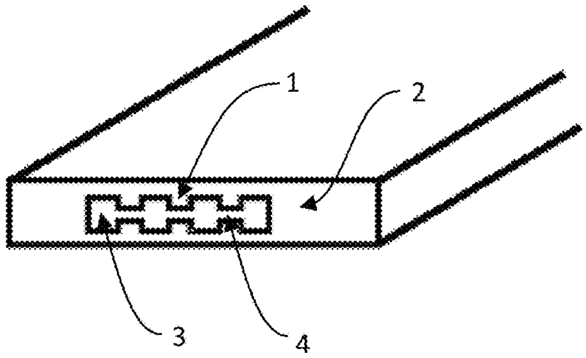
FIG. 2*a* shows a schematic perspective view of a dual-polarization antenna array according to an embodiment of the application.
Figure 2B:
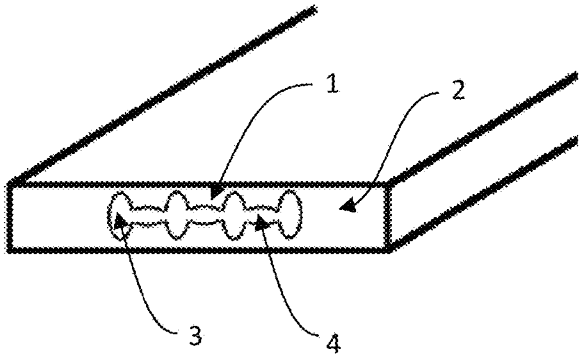
FIG. 2*b* shows a schematic perspective view of a dual-polarization antenna array according to an embodiment of the application.
Figure 3A:
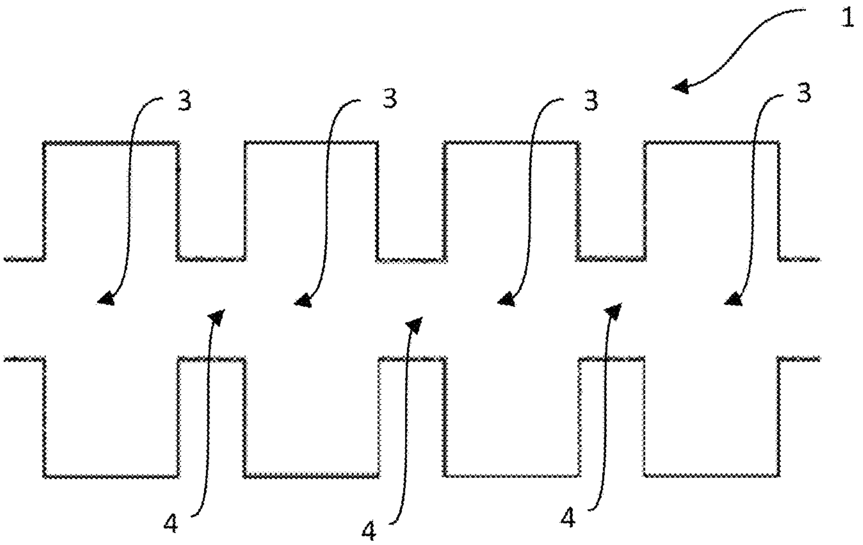
FIG. 3*a* is a further schematic illustration of the embodiment of FIG. 1*a;*

The aperture pattern, shown schematically in FIG. 1*a* to 1*c*, comprises at least one first aperture 3 having a first configuration and at least one second aperture 4 having a second configuration. Each first aperture 3 is directly interconnected with at least one second aperture 4. The aperture pattern may comprise of essentially rectangular shapes, as shown in FIG. 2*a*, of essentially elliptical shapes, having rounded corners as shown in FIG. 2*b*, a combination of both, or any other suitable shape. FIG. 3*a* shows a dual-polarization antenna array 1 comprising a larger number of first apertures 3, each pair of two first apertures 3 being interconnected by one second aperture 4 such that a chain-like structure is formed.

Figure 3B:
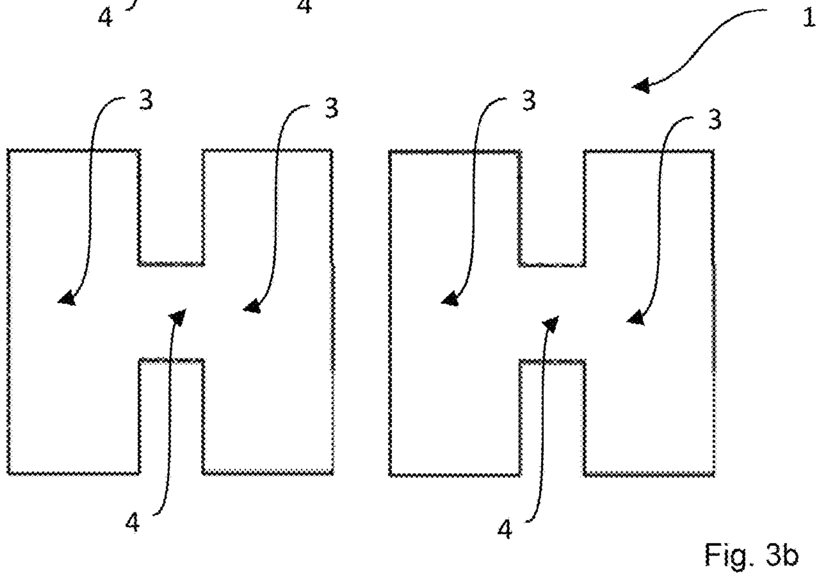
FIG. 3*b* shows a schematic illustration of an aperture pattern used in a dual-polarization antenna array according to an embodiment of the application.
Figure 4:
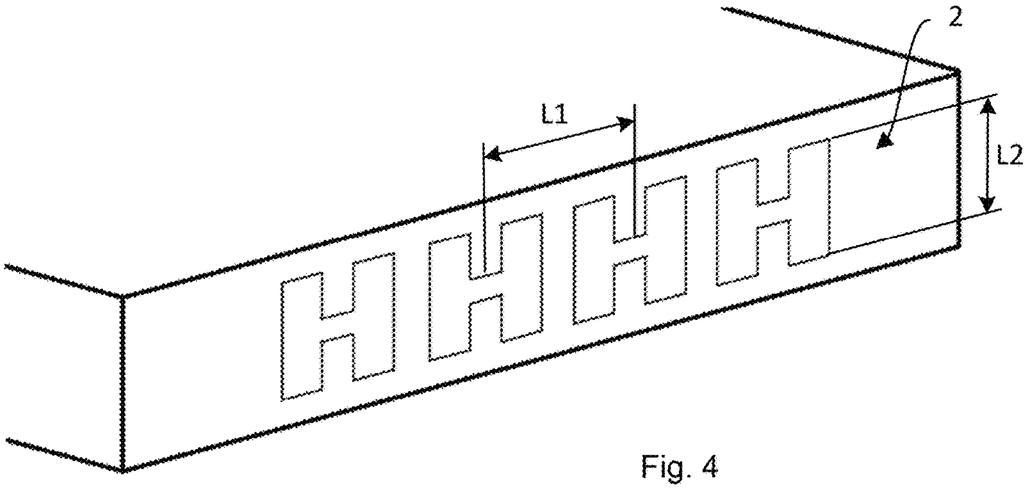
FIG. 4 is a further schematic illustration of the embodiment of FIG. 3*b*, indicating a possible relationship between different dimensions according to an embodiment of the application.

In one embodiment, the dual-polarization antenna array 1 comprises at least two first apertures 3 and at least one second aperture 4, the first apertures 3 and the second aperture 4 being arranged in periodic sequence such that each first aperture 3 is separated from an adjacent first aperture 3 by a second aperture 4, and each second aperture 4 is directly interconnected with two adjacent first apertures 3. FIG. 3*b* shows a dual-polarization antenna array 1 comprising two first apertures 3 and one second aperture 4 directly interconnecting the two first apertures 3, i.e. the aperture pattern of FIG. 3*b* comprises two H-patterns. The dual-polarization antenna array 1 may comprise only one such H-pattern, pattern, or several subsequent H-patterns as shown in FIG. 4.

The dual-polarization antenna array 1 further comprises at least one first coupling element, i.e. conductor, 5 which is connected to a first antenna feed line 6, and at least one second coupling element, i.e. conductor, 7 which is connected to a second antenna feed line 8, as shown in FIG. 5*a* to 5*c* and 8*a* to 8*b*.

Figure 5A:
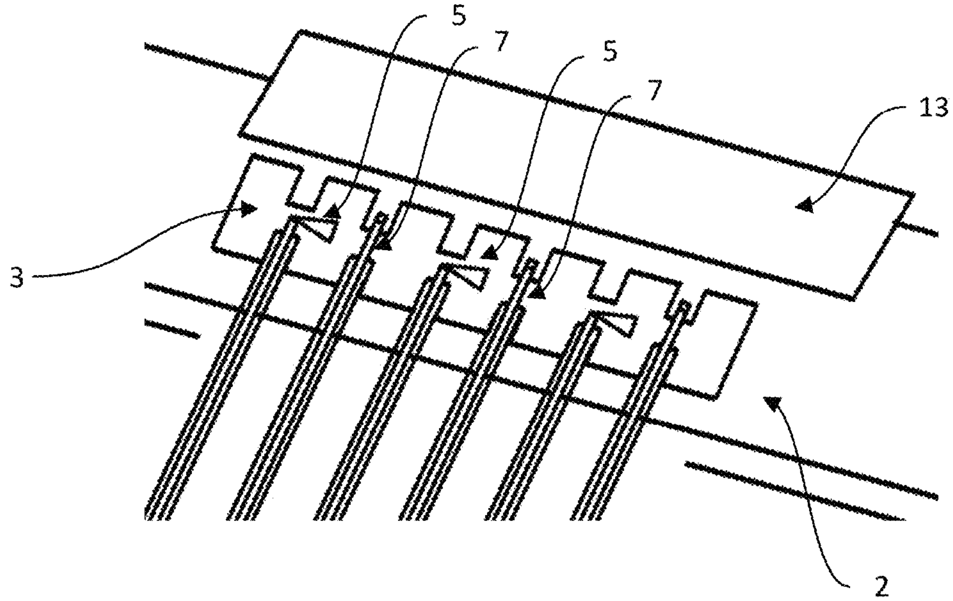
FIG. 5*a* shows a partial perspective view of a dual-polarization antenna array according to an embodiment of the application.
Figure 5B:
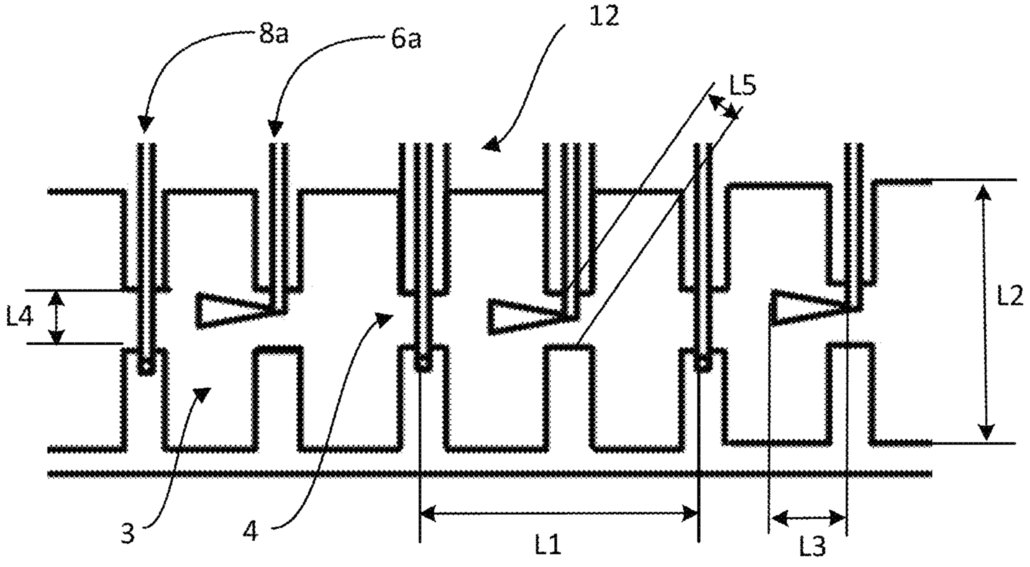
FIG. 5*b* shows a schematic top view of a dual-polarization antenna array according to an embodiment of the application.
Figure 5C:
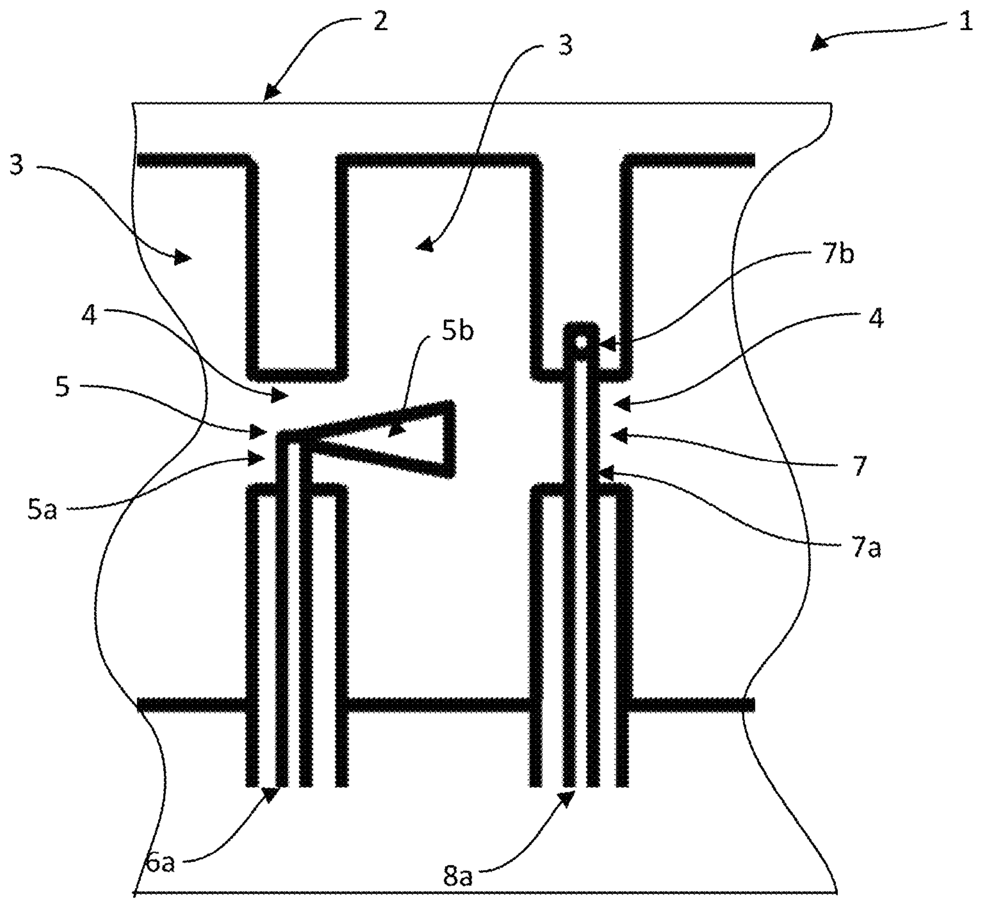
FIG. 5*c* shows a partial perspective view of the embodiments of FIG. 5*a* and 5*b* in more detail according to an embodiment of the application.

In one embodiment, shown in FIG. 5*a* to 5*c*, the first coupling elements 5 and the second coupling elements 7 are arranged such that every other second aperture 4 is at least partially juxtaposed with a second coupling element 7 and every other second aperture 4 is at least partially juxtaposed with a first coupling element 5. Each first coupling element 5 is additionally at least partially juxtaposed with one first aperture 3 adjacent the second aperture 4.

The first coupling element 5 is configured to excite an electrical field having a first polarization, and the second coupling element 7 is configured to excite an electrical field having a second polarization. Each first coupling element 5 is at least partially juxtaposed with one first aperture 3, which allows the electrical field having a first polarization to be transmitted and/or received through the first aperture 3. Correspondingly, each second coupling element 7 is at least partially juxtaposed with one second aperture 4, which allows the electrical field having a second polarization to be transmitted and/or received through the second aperture 4.

In one embodiment, the first aperture 3 has a larger area than the second aperture 4, and the first coupling element 5 is configured to excite an electrical field having horizontal polarization, while the second coupling element 7 is configured to excite an electrical field having vertical polarization, as shown in FIG. 5*c*.

The first end 7*a* of the second coupling element 7 may be connected to the second antenna feed line 8 at one side of the second aperture 4, while the second end 7*b* of the second coupling element 7 is coupled to the conductive structure 2 at an opposite side of the second aperture 4, as shown clearly in FIG. 5*c*. The second end 7*b* of the second coupling element 7 is at least one of galvanically, inductively, and capacitively coupled to the conductive structure 2.

Correspondingly, the first end 5*a* of the first coupling element 5 may be connected to the first antenna feed line 6 at one side of the second aperture 4, while the second end 5*b* of the first coupling element 5 is at least partially juxtaposed with one of the first apertures 3, which first aperture 3 is located adjacent the second aperture 4. The second end 5*b* of the first coupling element 5 is offset from the first end 5*a* of the first coupling element 5 in a direction towards a further, adjacent second aperture 4, as shown in FIG. 5*c*.

FIG. 5*c* shows a first coupling element 5 where the second end 5*b* extends only in one direction.

An unbalanced feed line 6*a*, 8*a* is connected to different types of conductors, i.e. coupling elements 5, 7, for differently polarized currents. For instance, the return current may flow through a common ground or other conductive parts. An unbalanced feed line 6*a*, 8*a* inherently couples to the common ground, which typically results into a significant mutual coupling between closely-located unbalanced feeds. To lower the mutual coupling between the feed lines 6*a*, 8*a*, they are typically physically offset, as shown in FIG. 5*a* to 5*c*). For instance, if λ/2 element separation is desired in a dual-polarized array, the distance between differently polarized feed lines 6*a*, 8*a* can be λ/4. Hereinafter λ is the wavelength at center frequency of the dual-polarization antenna array 1.

FIG. 5*b* shows preferable dimensions of the dual-polarization antenna array 1. L1, λ/4~λ/2, defines the inter-element spacing which will affect the directivity of the array and define the maximum grating-lobe free steering range. L2, λ/4~λ/2, defines the lowest operational frequency for the horizontal polarization. L3, approximately λ/4, defines the probe length which defines the resonant frequency for the horizontal polarization. L4, λ/15-λ/4, defines the conductor length which defines the resonant frequency for the vertical polarization, i.e. the length of the second coupling element 7 which extends across the second aperture 4. L5, λ/15-λ/4, defines the gap between two opposite "teeth" of the dual-polarization antenna array 1, which is modified to, in turn, modify the resonant frequency.

Figure 6A:
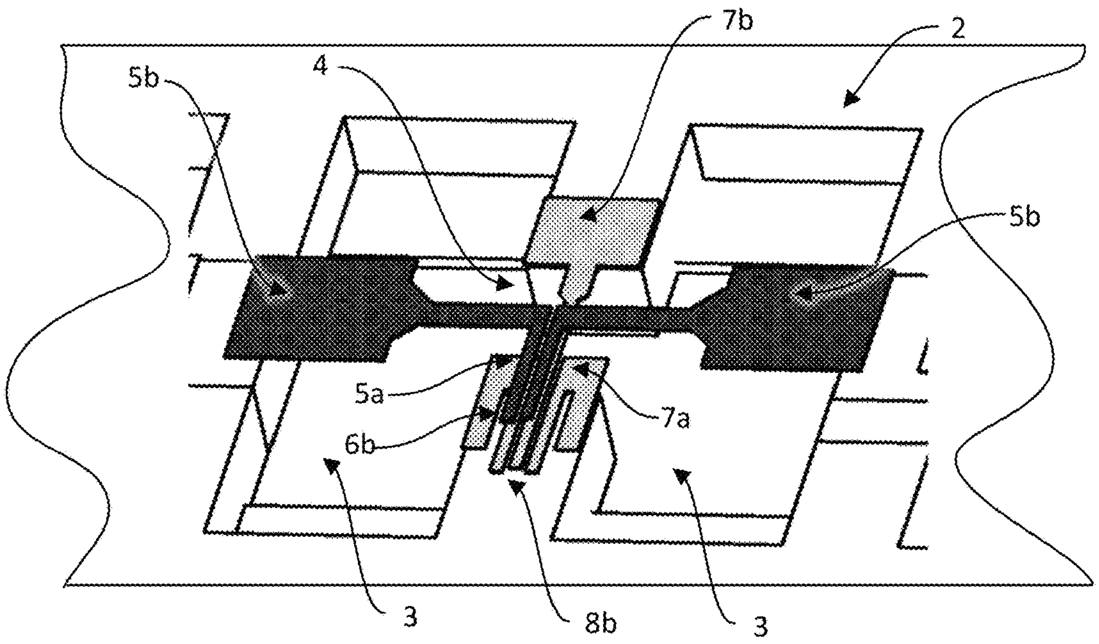
FIG. 6*a* shows a partial perspective view of a dual-polarization antenna array according to an embodiment of the application.
Figure 6B:
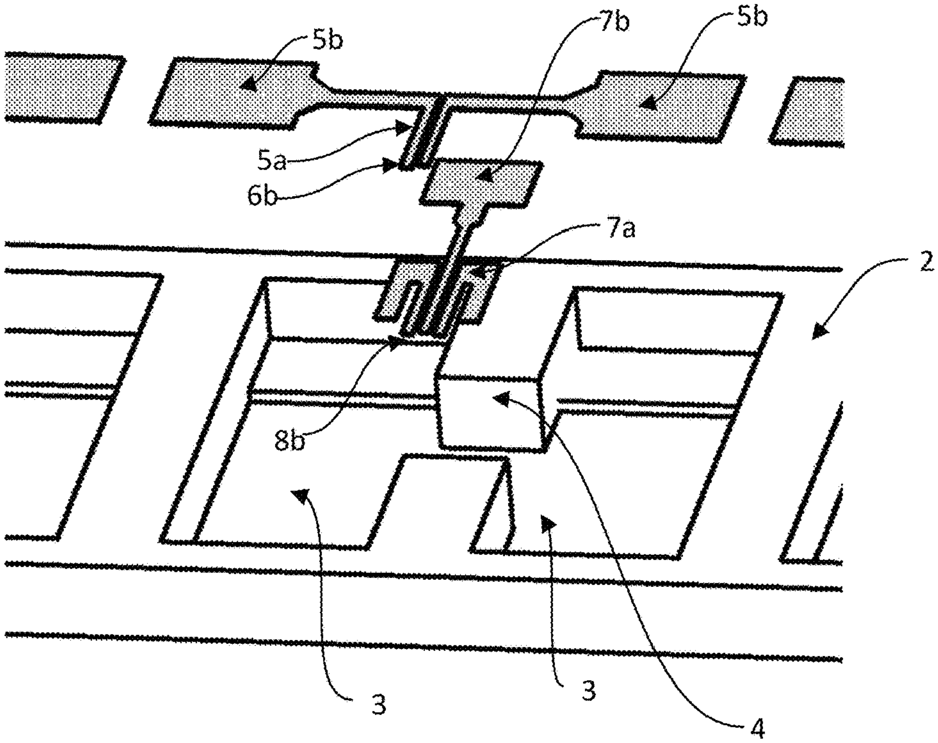
FIG. 6*b* shows a partial exploded view of the embodiment of FIG. 6*a;*

In a further embodiment, shown in FIG. 6*a*, 6*b*, the first coupling elements 5 and the second coupling elements 7 are arranged such that both one first coupling element 5 and one second coupling element 7 are at least partially juxtaposed with one second aperture 4, the first coupling element 5 and the second coupling element 7 being co-located.

The first coupling element 5 and the second coupling element 7 may also be connected to balanced feed lines 6*b*, 8*b*. As shown in FIG. 6*a*, 6*b*, the first coupling element 5 may comprise two conductors, i.e. two second ends 5*b* extending in two opposite directions, providing balanced excitation of two adjacent first apertures 3. Geometrically, a balanced feed line 6*b*, 8*b* is symmetrical and therefore the conductors for positive and negative currents are identical, as is clear from FIGS. 6*a*, 6*b*. Furthermore, both conductors couple equally to the conductive structure 2 and to other parts. Ideally, the differential mode of a balanced feed line does not couple to the conductive structure 2, or other nearby metal objects at all. Therefore, two orthogonally-polarized balanced feed lines 6*b*, 8*b* can be co-located, both feed lines being mutually uncoupled as shown in FIG. 6*b*). This embodiment improves the isolation and cross-polarization levels of each feed line. A balanced solution may rely on capacitive coupling from the second end 7*b* of the second coupling element 7 to the conductive structure 2.

One of first coupling element 5 and the second coupling element 7 may be connected to a balanced feed line 6*a*, 8*a* while the other coupling element is connected to an unbalanced feed line 6*a*, 8*a*, regardless of the first coupling element 5 and the second coupling element 7 being co-located or not.

Regardless whether the feed line 6, 8, and hence the coupling element 5, 7 is balanced or unbalanced, the coupling element 5, 7 can couple to the conductive structure 2 galvanically, capacitively or inductively. In galvanic coupling, either both ends of a balanced feed line 6*a*, 8*a*,or signal and ground conductors in case of an unbalanced feed line 6*b*, 8*b*, are galvanically connected to the conductive structure 2. This embodiment is most feasible with an unbalanced vertically polarized feed line, but can be used in other cases too. An unbalanced vertically polarized feed line 8*b* could also be realized with a capacitive coupling. In this case the signal would be coupled to certain area of the conductive structure 2 through a large parallel-plate capacitor at the second end 7*b*, as well as the ground coupling pad. This would facilitate the fabrication process since no galvanic connection is needed.

In a further embodiment, the coupling could also be done by utilizing magnetic fields such that currents in the feed line 6, 8 induce currents on the conductive structure 2.

As mentioned above, and shown in FIG. 7, the electronic device 9 comprises a display 10, a device chassis 11, and a dual-polarization antenna array 1. The conductive structure 2 of the dual-polarization antenna array 1 comprises at least a metal frame 14, and the device chassis 11 is at least partially enclosed by the display 10 and the metal frame 14. The first coupling elements 5 and second coupling elements 7 of the dual-polarization antenna array 1 are coupled to the metal frame 14.

The conductive structure 2 may furthermore comprise a PCB 12. The first coupling elements 5 and second coupling elements 7 of the dual-polarization antenna array 1 are arranged on the PCB 12 which extends at least partially in parallel with the metal frame 14, between the metal frame 14 and the device chassis 11. The coupling elements 5, 7, when realized on the PCB 12, are relatively easy and inexpensive to manufacture.

In one embodiment, the first coupling elements 5, the second coupling elements 7, and the conductive structure 2 are configured using at least one of molded interconnect device technology, laser direct structuring technology, flexible printed circuits, metal-spraying techniques and related technologies.

The aperture pattern in the metal frame 14 can be filled with dielectric material such as plastic for robustness and sealing purposes.

Figure 7:
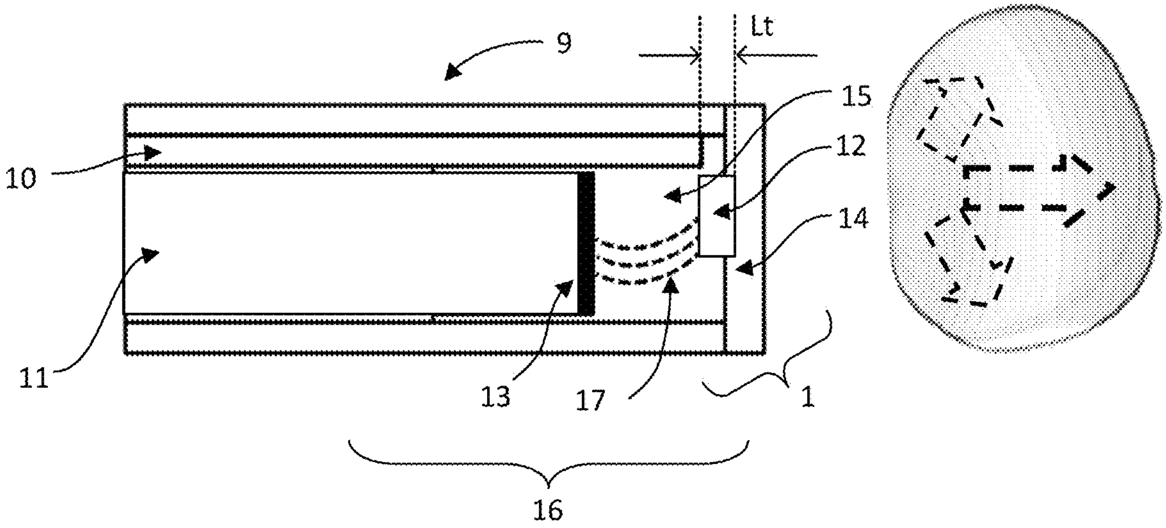
FIG. 7 shows a schematic cross-sectional view of an electronic device according to an embodiment of the application.

In one embodiment, the electronic device 9 comprises a reflecting structure 13 extending in parallel with the at least one first aperture 3 and the at least one second aperture 4 of the conductive structure 2, as shown in FIG. 5*a* and 7. The reflecting structure 13 may be an existing component of the electronic device 9, such as the device chassis 11, a battery, a shielding structure, or another conductive component. The reflecting structure 13 may be located at approximately λ/4 from the aperture pattern at the conductive structure 2 in order to direct radiation outwards from the electronic device.

The dual-polarization antenna array 1 may be configured to generate millimeter-wave frequencies. Furthermore, the dual-polarization antenna array 1 may comprise at least one end-fire antenna element.

The electronic device 9 may also comprise at least one further antenna array 16 configured to generate non-millimeter-wave frequencies, e.g. a sub-6 GHz antenna being part of the metal frame 14. The further antenna array 16 is configured by the device chassis 11 and the metal frame 14 with feed lines 17 extending partially adjacent the dual-polarization antenna array 1 and partially across a gap 15 formed between the device chassis 11 and the metal frame 14.

The communication performance of the electronic device 9 is further improved by beamforming directed along the edges the electronic device in the directions indicated by the arrows in FIG. 7. The edges of the metal frame 14 are exposed to free-space in typical user scenarios. Steering the dual-polarization beams in these directions enables omni-coverage.

The present disclosure allows the size of the apertures in the metal frame 14, and the antenna thickness Lt, shown in FIG. 7 to be reduced, from as common in prior art λ/2 (4-5 mm) and λ/4 (2 mm) to λ/20 (0.5 mm), i.e. a reduction by about 40% and 80%, respectively. In one embodiment, the necessary aperture height is 3 mm. In a further embodiment, the antenna thickness, in the direction of the gap 15, is Lt=0.3 mm.

As mentioned above, the conductive structure 2 of the dual-polarization antenna array 1 may be configured by the metal frame 14 and the PCB 12, as shown in FIG. 8*a* and FIG. 8*b*, where dielectric structures are hidden for the sake of clarity. The aperture patterns of the conductive structure 2 are configured as follows: the second apertures 4 are defined by metallization layers of the PCB 12, and the first apertures 3 are defined by metallization layers of the PCB 12 and an aperture in the metal frame 14. This solution enables the coexistence of sub-6 GHz antennas with 5G mm-wave antennas: both sub 6-GHz antennas 16 and the millimeter-wave dual-polarization antenna array 1 share the same volume of the metal frame 14 and the same volume of the gap 15 between the metal frame 14 and the chassis 11. The aperture pattern of the metal frame 14 does not degrade performance of the sub 6-GHz antennas 16.

Figure 9:
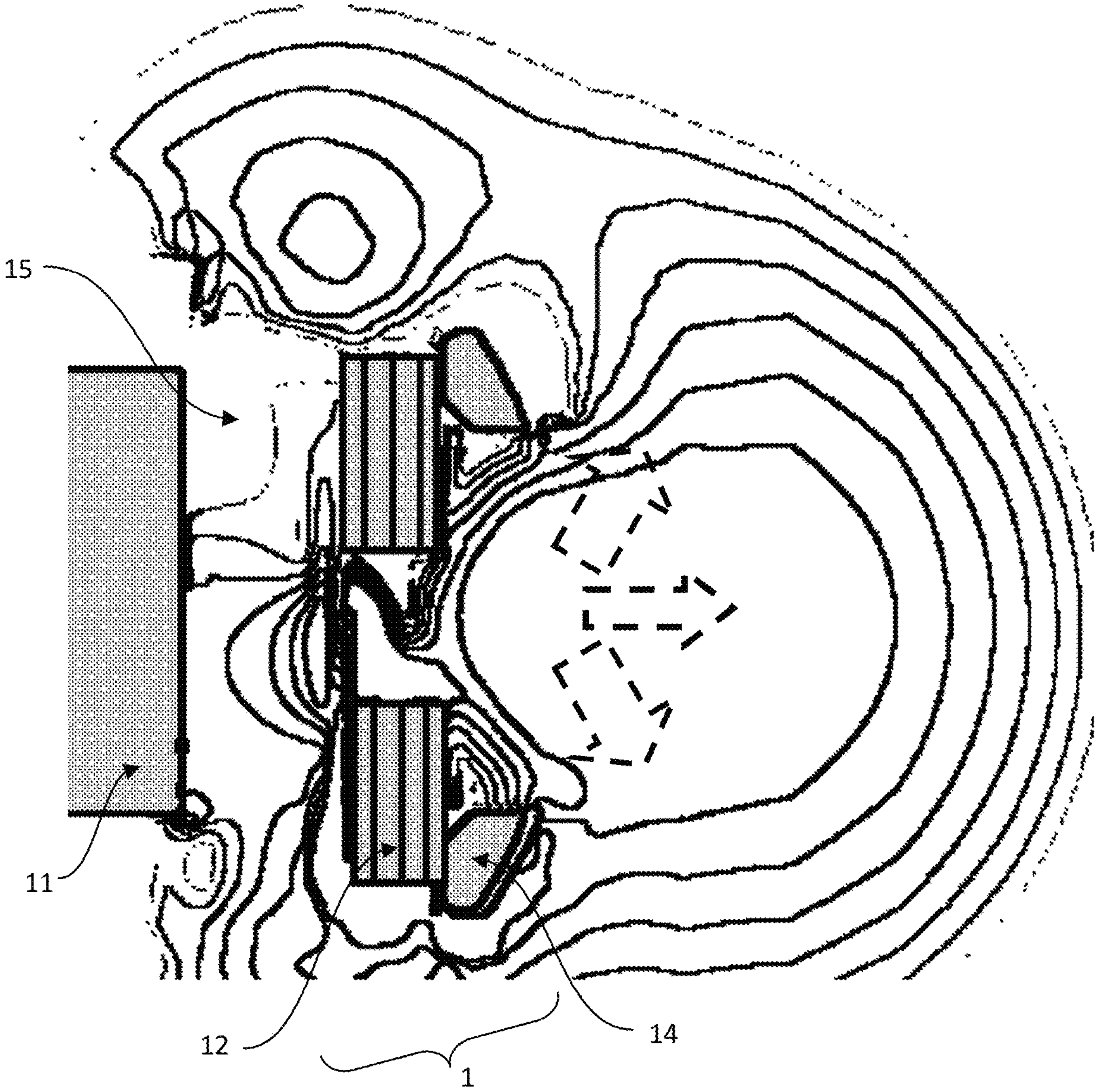
FIG. 9 shows a schematic cross-sectional view of an electronic device and the radiation of the electromagnetic field generated by the electronic device according to an embodiment of the application.

The radiation of the electromagnetic field generated by the electronic device 9 is shown in FIG. 9. Lines of equal electric potential are illustrated for the horizontal polarization radiation, which is generated by first coupling elements 5. A reactive electric field is generated within the gap 15, between the device chassis 11 and the metal frame 14, illustrating efficient usage of the gap 15 volume for bandwidth and antenna efficiency improvement. At the same time, the dual-polarization array 1 does not require any conductive structures present within the gap 15, thus enabling coexistence with the above-mentioned further antenna array 16 which generates non-millimeter-wave frequencies, as shown in FIG. 7.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or operations, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

What is claimed is:

1. A dual-polarization antenna array, comprising:

a conductive structure, having an aperture pattern comprising at least two first apertures each having a first configuration and at least one second aperture having a second configuration, wherein each pair of the at least two first apertures is directly interconnected by one of the at least one second aperture, the first apertures and the second aperture being arranged in periodic sequence such that each first aperture is separated from an adjacent first aperture by a second aperture, and each second aperture is directly interconnected with two adjacent first apertures;

at least one first coupling element connected to a first antenna feed line; and at least one second coupling element connected to a second antenna feed line, wherein the at least one first coupling element is configured to excite a first electrical field having a first polarization, wherein the at least one second coupling element is configured to excite a second electrical field having a second polarization, wherein each first coupling element is at least partially juxtaposed with one first aperture, allowing the first electrical field having the first polarization to be transmitted or received through the first aperture, and wherein each second coupling element is at least partially juxtaposed with one second aperture, allowing the second electrical field having the second polarization to be transmitted or received through the second aperture.

2. The dual-polarization antenna array according to claim 1, wherein the first aperture has a larger area than the second aperture, wherein the first coupling element is configured to excite an electrical field having horizontal polarization, and wherein the second coupling element is configured to excite an electrical field having vertical polarization.

3. The dual-polarization antenna array according to claim 1, wherein a first end of the second coupling element is connected to the second antenna feed line at one side of the second aperture, and wherein a second end of the second coupling element is coupled to the conductive structure at an opposite side of the second aperture.

4. The dual-polarization antenna array according to claim 3, wherein the second end of the second coupling element is at least one of galvanically, inductively, and capacitively coupled to the conductive structure.

5. The dual-polarization antenna array according to claim 1, wherein a first end of the first coupling element is connected to the first antenna feed line at one side of the second aperture, and wherein a second end of the first coupling element is at least partially juxtaposed with the first aperture adjacent to the second aperture.

6. The dual-polarization antenna array according to claim 5, wherein the second end of the first coupling element is offset from the first end of the first coupling element in a direction towards to an adjacent second aperture.

7. The dual-polarization antenna array according to claim 1, wherein the first coupling element and the second coupling element are connected to one of an unbalanced antenna feed line and a balanced antenna feed line.

8. The dual-polarization antenna array according to claim 1, wherein the first coupling elements and the second coupling elements are arranged such that every other second aperture is at least partially juxtaposed with a second coupling element and every other second aperture is at least partially juxtaposed with a first coupling element, and wherein each first coupling element additionally is at least partially juxtaposed with one first aperture adjacent to the second aperture.

9. The dual-polarization antenna array according to claim 1, wherein one first coupling element and one second coupling element are at least partially juxtaposed with one second aperture.

10. The dual-polarization antenna array according to claim 1, wherein the aperture pattern comprises at least one H-pattern, each H-pattern comprising two first apertures and one second aperture directly interconnecting the first apertures.

11. An electronic device, comprising:

a display, a device chassis, and a dual-polarization antenna array, further comprising:

a conductive structure, having an aperture pattern comprising at least two first apertures each having a first configuration and at least one second aperture having a second configuration, wherein each pair of the at least two first apertures is directly interconnected by one of the at least one second aperture, the first apertures and the second aperture being arranged in periodic sequence such that each first aperture is separated from an adjacent first aperture by a second aperture, and each second aperture is directly interconnected with two adjacent first apertures;

at least one first coupling element being connected to a first antenna feed line; and at least one second coupling element being connected to a second antenna feed line, wherein the at least one first coupling element is configured to excite a first electrical field having a first polarization, wherein the at least one second coupling element is configured to excite a second electrical field having a second polarization, wherein each first coupling element is at least partially juxtaposed with one first aperture, allowing the first electrical field having the first polarization to be transmitted or received through the first aperture, wherein each second coupling element is at least partially juxtaposed with one second aperture, allowing the second electrical field having the second polarization to be transmitted or received through the second aperture, wherein the conductive structure of the dual-polarization antenna array comprises a metal frame, wherein the device chassis is at least partially enclosed by the display and the metal frame, wherein first coupling elements and second coupling elements of the dual-polarization antenna array are coupled to the metal frame.

12. The electronic device according to claim 11, wherein the conductive structure further comprises a printed circuit board extending at least partially in parallel with the metal frame, between the metal frame and the device chassis, wherein the first coupling elements and the second coupling elements of the dual-polarization antenna array are arranged on the printed circuit board.

13. The electronic device according to claim 11, further comprising a reflecting structure extending in parallel with the at least one first aperture and the at least one second aperture of the conductive structure.

14. The electronic device according to claim 11, wherein the dual-polarization antenna array is configured to generate millimeter-wave frequencies.

15. The electronic device according to claim 14, wherein the dual-polarization antenna array comprises at least one end-fire antenna element.

16. The electronic device according to claim 11, further comprising at least one further antenna configured by the device chassis and the metal frame with feed lines extending partially adjacent to the dual-polarization antenna array and partially across a gap between the device chassis and the metal frame, the further antenna generating non-millimeter-wave frequencies.

17. The electronic device according to claim 11, wherein a first end of the second coupling element is connected to the second antenna feed line at one side of the second aperture, wherein a second end of the second coupling element is coupled to the conductive structure at an opposite side of the second aperture.

18. The dual-polarization antenna array according to claim 11, wherein a first end of the first coupling element is connected to the first antenna feed line at one side of the second aperture, and wherein a second end of the first coupling element is at least partially juxtaposed with the first aperture adjacent to the second aperture.

19. The dual-polarization antenna array according to claim 18, wherein the second end of the first coupling element is offset from the first end of the first coupling element in a direction towards to an adjacent second aperture.

* * * * *